United States Patent [19]

Heshmat

[11] 4,277,112
[45] Jul. 7, 1981

[54] STEPPED, SPLIT, CANTILEVERED COMPLIANT BEARING SUPPORT

[75] Inventor: Hooshang Heshmat, Troy, N.Y.

[73] Assignee: Mechanical Technology Incorporated, Latham, N.Y.

[21] Appl. No.: 80,503

[22] Filed: Oct. 1, 1979

[51] Int. Cl.³ ............................................. F16C 32/06
[52] U.S. Cl. ........................................ 308/9; 308/160; 308/DIG. 1
[58] Field of Search ................. 308/9, 73, 121, 160, 308/168, DIG. 1

[56] References Cited

U.S. PATENT DOCUMENTS

| | | | |
|---|---|---|---|
| 3,382,014 | 5/1968 | Marley | 308/9 |
| 3,635,534 | 1/1972 | Barnett | 308/160 |
| 3,809,443 | 5/1974 | Cherubim | 308/9 |
| 4,082,375 | 4/1978 | Fortmann | 308/9 |
| 4,208,076 | 6/1980 | Gray et al. | 308/9 |
| 4,222,618 | 9/1980 | Miller, Jr. | 308/9 |

Primary Examiner—Richard R. Stearns
Attorney, Agent, or Firm—John M. Neary; Joseph V. Claeys

[57] ABSTRACT

A compliant hydrodynamic fluid film bearing made of three or more pads, each having a thin, flexible bearing sheet supported by a resilient support element fastened to a mount. A set of split, tiered stiffener sheets is fastened between the bearing sheet and the support element to provide an increasing stiffness gradient to the pad from its leading to trailing edges. The support element includes a plurality of resilient elevations that also increase in stiffness toward the trailing edge for the same purpose. The pad profile changes with changing hydrodynamic loading to present an optimal profile for maximal load carrying over the full speed range of the bearing.

33 Claims, 5 Drawing Figures

STEPPED, SPLIT, CANTILEVERED COMPLIANT BEARING SUPPORT

BACKGROUND OF THE INVENTION

This invention relates to compliant fluid film bearings, and more particularly to a compliant hydrodynamic fluid film thrust bearing.

Compliant hydrodynamic gas thrust bearings are being used in high performance machinery which is subject to extreme conditions of temperature and speed. These bearings are ideally suited for these conditions because they do not suffer from the speed and durability limitations of rolling element bearings, and because they do not require oil lubrication and therefore do not require oil circulation, seals, and conditioning equipment necessary for use in oil bearings.

A compliant hydrodynamic fluid film bearing ordinarily employs one or more bearing pad assemblies, each including a resilient supporting element and an attached overlying bearing sheet. The pads are mounted on the surface of a mounting member in bearing relationship to a relatively rotating member. According to the theory of the hydrodynamic compliant fluid film bearing, a hydrodynamic supporting fluid film is generated by the relative movement of the thrust runner over the bearing sheet to support the thrust runner on a thin cushion of fluid. The compliance of the supporting element underlying the bearing sheet enables it to deflect to assume a profile relative to the thrust runner surface which is productive of a supporting pressurized fluid cushion over the pad. It also enables the bearing sheet to conform, to some extent, to misaligned, unbalanced, and thermally or mechanically distorted rotating members.

Despite the proven advantages that the use of these bearings confer, I have identified certain situations in which room for improvement exists. For example, high load carrying capacity for existing compliant gas bearings is generated only at relatively high speeds. Normally this is not a matter of concern because gas bearings are normally used in high speed applications. However, it would militate for longer bearing life if load capacity were generated at a lower speed to reduce the period during start-up and slow-down that the rotating member is in contact with the bearing sheet. A high load capacity at low rotor speeds would also increase the range of applications for which these bearings are applicable.

Some gas bearings which are designed for a particular range of speed, load, and temperature lose their load capacity when these ranges are exceeded. The desirability of bearings which function well at conditions considerably in excess of the design point, as well as the design point conditions, would increase the usefulness of these bearings by increasing their range of application and their safety margin, and thereby lessening the expense for redundant or larger capacity bearings.

SUMMARY OF THE INVENTION

Accordingly, it is an object to provide a compliant hydrodynamic fluid film bearing having an improved load bearing capacity over a greater range of operating speeds.

These and other objects of the invention are achieved by the disclosed best modes of the invention embodied in bearing pads having a thin flexible metal bearing sheet supported by a compliant support element in turn supported by a mount. A split stiffening element, disposed between the bearing sheet and the support element, cooperates with the support element to provide a stiffness gradient from the leading to the trailing edge which enables the bearing sheet to assume a crown shape during operation such that an optimum hydrodynamic pressurized supporting gas cushion is generated over the bearing sheet for supporting the thrust runner.

DESCRIPTIONS OF THE DRAWINGS

The invention and its many attendant objects and advantages will become more apparent upon reading the following description of the preferred embodiment when read in conjunction with an examination of the appended drawings, wherein.

DESCRIPTION OF THE PREFERRED EMBODIMENT

Figure 1:
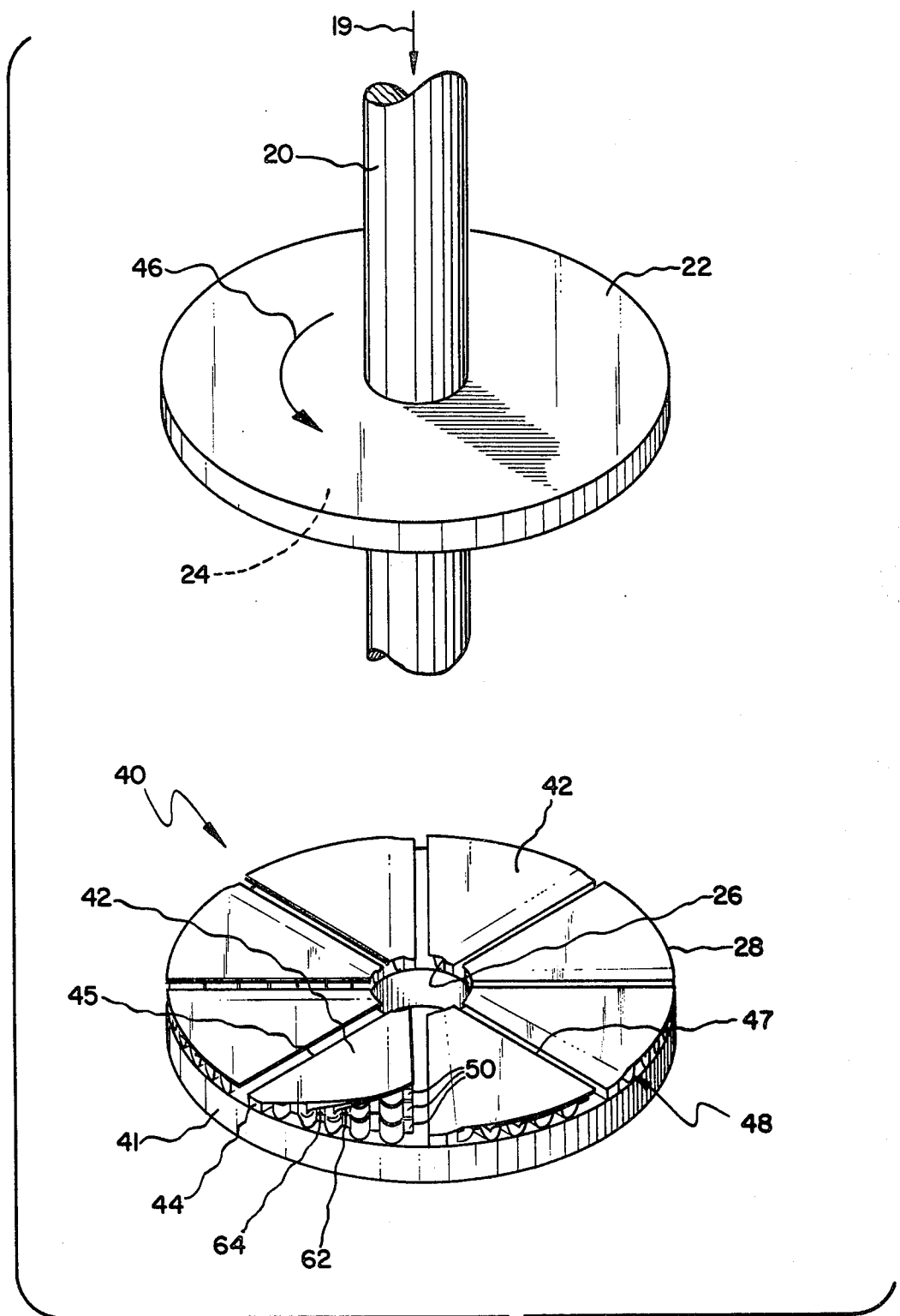
FIG. 1 is a perspective and partially developed view of a thrust bearing made in accordance with this invention.

Referring now to the drawings wherein like reference characters designate identical or corresponding parts and more particularly to FIG. 1 thereof, a compliant hydrodynamic fluid film thrust bearing is shown for supporting the axial thrust 19 of a rotating shaft 20. A thrust runner 22 having a downwardly facing bearing surface 24 is fastened to the shaft and rotates with it. The axial thrust 19 of the shaft 20 is borne by a plurality of thrust pad assemblies 40 which are fastened to the top surface of a thrust plate 41. The thrust plate 41 is usually stationary relative to the machine frame, but in some applications it is advantageous for both the rotor and the thrust plate to rotate. The invention is usable with all forms of relative rotation between the thrust plate and thrust runner.

Figure 2:
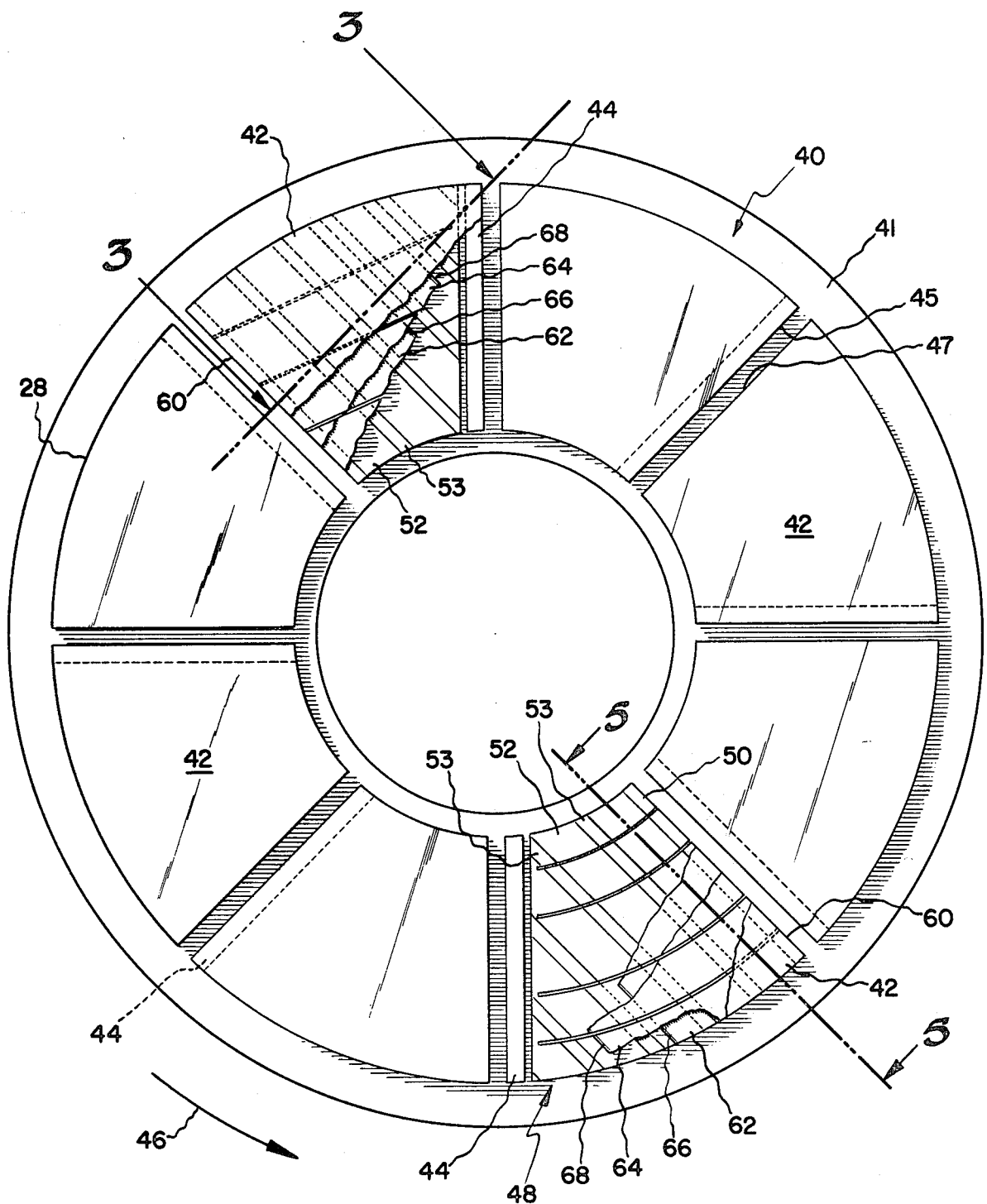
FIG. 2 is a plan view of the thrust plate and bearing pads of the thrust bearing shown in FIG. 1.

Each thrust pad assembly 40 is in the form of a truncated sector having an inside periphery 26 and outside periphery 28. Eight pads are illustrated in FIGS. 1 and 2, however, fewer or more pads can be used. Each pad includes a bearing sheet 42 welded to the top surface of a spacer block 44 at the leading edge 45 of the thrust runner in the sense of the rotation of the thrust runner, shown by arrow 46, and is free at the trailing edge 47.

Figure 3:
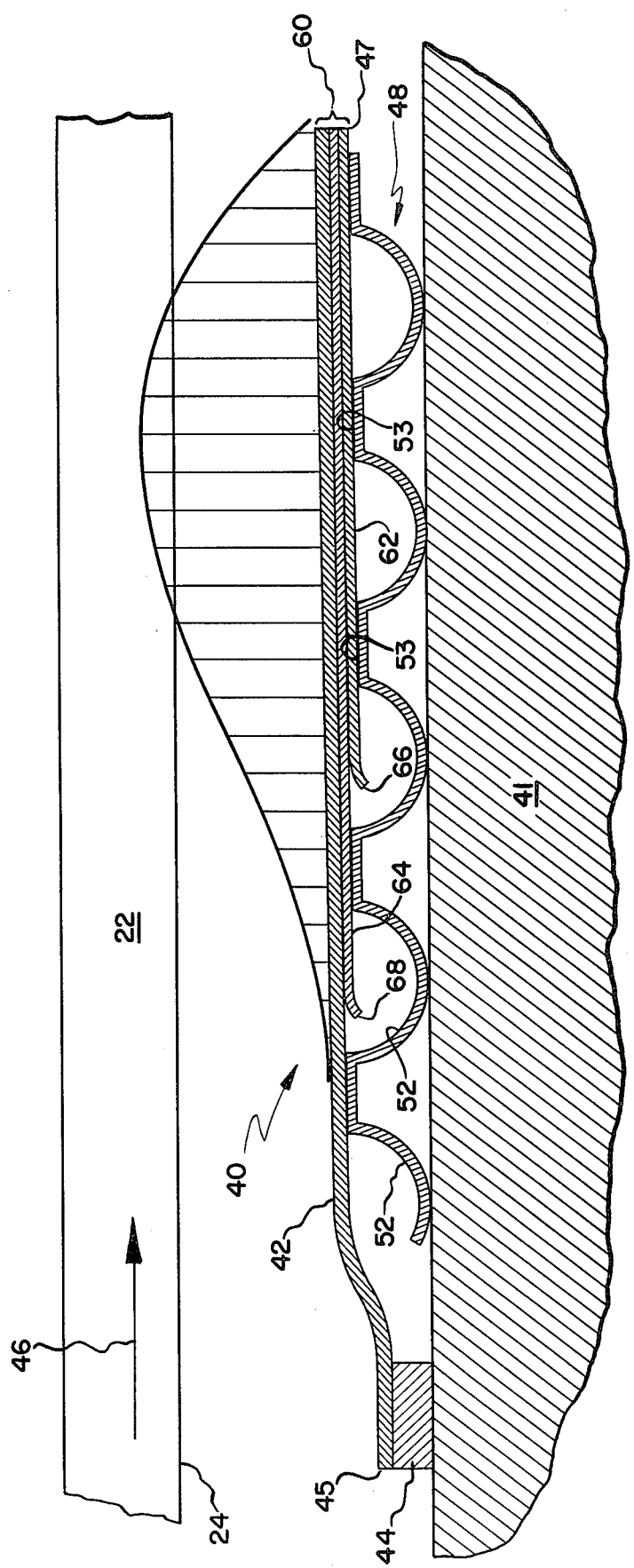
FIG. 3 is a sectional elevation of one of the pads along lines 3—3 in FIG. 2 and a superimposed pressure diagram, of low rotor speed.

The rotation of the thrust runner 22 in the direction shown by the arrow 46 generates a hydrodynamic fluid film over the thrust pads 40 which supports the runner and separates it from the bearing sheets 42 of the pads 40. The hydrodynamic fluid film is created by the viscous or shear forces acting in the fluid parallel to the direction of relative movement between the bearing surface of the thrust runner 22 and the bearing surface of the bearing sheet. The bearing surface 24 of the runner drags the boundary layer of fluid with it as it rotates over the bearing sheet, and the boundary layer in turn drags in the layer of fluid immediately adjacent to it, and in this way a velocity gradient is established in the fluid in the gap between the thrust runner and the bearing sheet. As shown in FIG. 3, the gap between the bearing sheet and the thrust runner bearing surface 24 is wedge shaped, tapering in the direction of movement of the rotating bearing surface 24. The pressure of the fluid drawn into the wedge shaped gap tends to increase toward the narrow end of the gap, thus creating the pressurized cushion or fluid film which dynamically supports the rotating thrust runner.

The bearing sheet of the pad 40 is supported on a compliant support element 48 to enable the bearing sheet to conform to the plane of the bearing surface of the rotating rotor despite conditions which cause permanent or transient skew between the thurst runner bearing surface 24 and the plane of the thrust plate. These conditions include, among others, bearing or rotor misalignment, thermal distortion, centrifugal growth of the runner, and rotor runout due to eccentric loads or rotor imbalance. The compliant support element can deflect and recover to support the bearing sheet in correct hydrodynamic relationship to the bearing surface 24 of the rotating thrust runner 22 despite these conditions.

The resilient support element 48 is a spring metal resilient element in the form of a corrugated or wavey spring having resilient elevations or ridges 53 separated by valley floors 52. The ridges 53 preferably are flattened on their top surface as shown in FIG. 3, although they can be rounded at their top surface as shown in my co-pending application Ser. No. 974,256 filed on December 29, 1978 or take the form of a sine wave. The conformance of the bearing sheet 42 to the plane of the bearing surface 24 of the thrust runner 22 is facilitated by slitting the support element 48 into a plurality of radially adjacent strips 50. The strips can be chordal strips as shown in the pad at the eleven o'clock position in FIG. 2 or can be arcuate as shown in the pad at the five o'clock position. The strips 50 may be formed from a single sheet by slitting the sheet prior to forming into the corrugated form, almost but not quite to the leading edge of the support element 48. Alternatively, the strips 50 may be formed of different materials or different gauges of the same material to provide a variation in stiffness of the support element in the radial direction. For example, the outer and inner strips could be Inconel X-750 with a pitch of 0.165" and 0.185" respectively, and the center strips could be stainless steel 416 or 17-4 HP. This arrangement puts the stiffest strips in the center where the greater load is concentrated, puts the soft strip on the inside where the load is lightest, and the medium stiffness on the outside where the load is moderate and compliance is most needed to handle the thermal dishing and runout of the runner. The support element is fastened to the thrust plate 41 as by mechanical attachment or welding the valley floors to the thrust plate 41.

A stiffening element 60 is disposed between the support element 48 and the bearing sheet 42. The purpose of the stiffening element 60, as more fully discussed below, is to augment and modify the distribution of support pressure provided for the bearing sheet 42 over the area of the bearing pad in such a way as to optimize the support characteristics for the bearing sheet so that its deflection under load is not detrimental to its ability to generate a hydrodynamic pressurized cushion over its surface in the presence of rotation of the thrust runner 22, but rather deflects to a profile which actually improves the load capacity of the thrust pad assembly 40. In addition, the stiffening element improves the damping characteristics of the bearing pad to absorb vibration energies and prevent the bearing sheet from vibrating at fractions or multiples of its resonant frequency at high rotor speed.

The stiffening element 60 includes a first flat stiffener sheet 62 lying over and supported directly by the trailing portion of the support element 48, and a second stiffener sheet 64 lying over and supported by the first stiffener sheet 62 and a portion of the support element forward of the leading edge of the first stiffener sheet 62. The first stiffener sheet 62 underlies the second stiffener sheet 64 and approximately one-third to one-half of the bearing sheet 42; the second stiffener sheet 64 underlies and directly supports about one-half to two-thirds of the area of the bearing sheet 42.

The leading edges 66 and 68 of the first and second stiffener sheets 62 and 64 respectively are formed in a slightly downwardly curving bend to avoid a sharp demarcation line of the support provided for the bearing sheet 42 to prevent any stress concentrations which such a sharp demarcation line might produce. The first and second stiffener sheets 62 and 64 are welded along their trailing edges to the trailing edge of the bearing sheet 42. The stiffener sheets are slit into parallel adjacent strips which are aligned vertically over the strips 50 of the support element 48 as shown in FIG. 2 to provide the compliance in the radial direction that will enable the bearing pad to deflect locally without affecting or being affected by radially adjacent portions of the pad.

The tapered gap between the bearing pad and the bearing surface 24 of the thrust runner is established by the heights of the ridges 53 and the thickness of the stiffener sheets. The elevation closest to the leading edge is the same height or higher than the adjacent elevation, but when the thickness of the overlying forward end of the stiffener sheet 64 is added to the height of the second elevation, the total height at which the bearing sheet 42 is supported, termed hereinafter the "support height," is greater than the "support" height at the first elevation. Likewise, the support height at the third elevation is greater than that at the second elevation even though the ridge itself is lower yet.

One particular example of a thrust bearing made in accordance with this invention uses bearing materials made of Inconel X-750 foil. The bearing sheet is 0.0035 inches thick, the stiffener sheets are both 0.0020 inches thick and the support element is 0.0030 inches thick. The bump heights from leading to trailing edge are as follows: #1—0.0205, #2—0.0205, #3—0.0203, #4—0.0201, and #5—0.0201. The bump pitch is 0.180. The support element and stiffener sheets are formed of five strips, the outer and inner ones having a width, in the direction across the pad perpendicular to rotor motion, of 0.180 inches, and the three center strips having a width of 0.170 inches.

The effect of the arrangement, illustrated by this example, is to produce a wedge-shaped gap between the bearing sheet 42 and the bearing surface 24 of the thrust runner 22, and also to make the support for the bearing sheet stiffer toward the trailing edge. The increasing stiffness is produced because the ridges or bumps 53 are themselves stiffer toward the trailing edge by virtue of their decreased height. The bump stiffness can also be increased by decreasing the bump pitch, increasing the metal thickness, changing the bump shape, and a number of other strategems.

The stiffener sheets 62 and 64 also increase the support stiffness for the bearing sheet from leading toward trailing edge. The portion of the top stiffener sheet 64 extending beyond the bottom stiffener sheet 62 provides increased stiffness to the support for the bearing sheet over that provided by the first bump alone, and this stiffness increases toward the second bump by virtue of the cantilevered or overhanging disposition of the forward end of the stiffener sheet 64 over the second bump. Likewise, the forward portion of the bottom stiffener sheet 62 overhangs the third bump to provide a springy and increasingly stiff support to the bearing sheet 42 from leading to trailing edge.

Two stiffener sheets are shown, but the use of more than two, indeed as many as ten sheets, is contemplated. These sheets are arranged in the same overlapping tiered or inverse terraced array as shown for two stiffener sheets, but the sheets are thinner and overlap each other by a smaller amount. The damping is improved with more stiffener sheets.

A thrust bearing made in accordance with the above description provides improved load support, improved tolerance of a misaligned or distorted thrust runner bearing surface, and a greater freedom from metal fatigue and hot spots. These improvements are believed to be explained by the following theoretical description of the operation of the bearing. This description is provided for the purpose of elucidation and is not to be regarded as a limitation to the claims not expressly so limited.

In operation, the thrust runner 22 lies against the bearing sheets 42 of the pads 40 on the thrust plate 41. When the shaft 20 of the rotor starts to turn, the bearing surface 24 slides across the bearing surface of the bearing sheet 42 in the direction of the arrow 46. The profile of the bearing sheet 42 relative to the bearing surface 44 of the thrust runner 22 at this time is that of a tapered land and provides the optimum shape for the generation of a supporting hydrodynamic fluid film at low speeds.

As the hydrodynamic supporting fluid film pressure increases over the bearing sheet because of the increasing speed of the thrust runner 22, the support element 48 and the stiffening element 60 begin to deflect. The pressure distribution of the hydrodynamic supporting fluid film over the pad, as shown in FIG. 3, is greatest near the trailing half of the pad, and this pressurized cushion of fluid acts as a load at the end of a cantilevered beam to produce a parabolic deflection of the pad. The stiffening element prevents the bearing sheet from merely deflecting into the valleys 52 and enables the load to be distributed evenly over the trailing portion of the support element 48 to produce the parabolic deflected shape.

Figure 4:
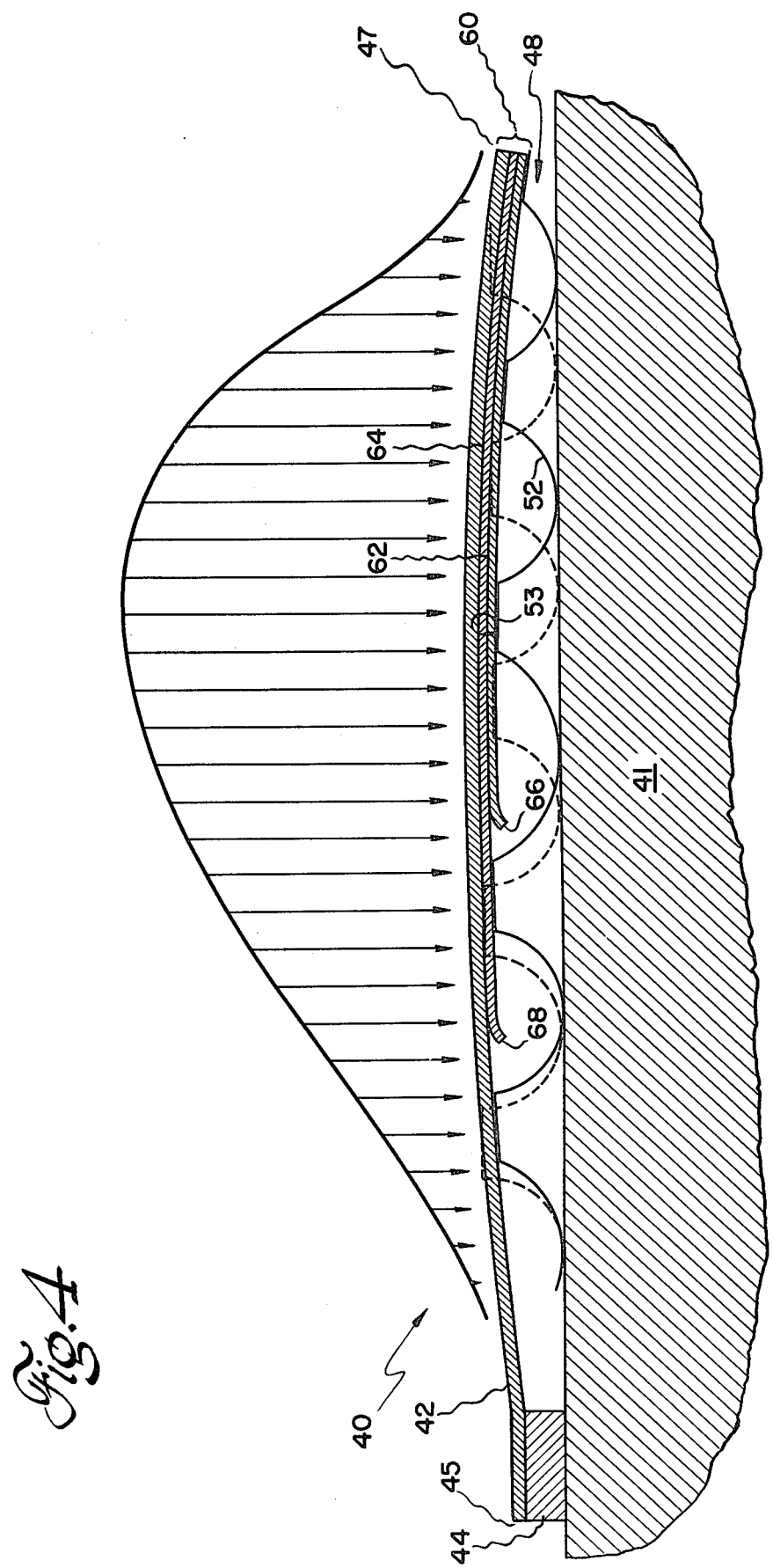
FIG. 4 is a sectional elevation of a bearing pad along lines 3—3 in FIG. 2 and a superimposed pressure diagram over the bearing pad, at high rotor speed.
Figure 5:
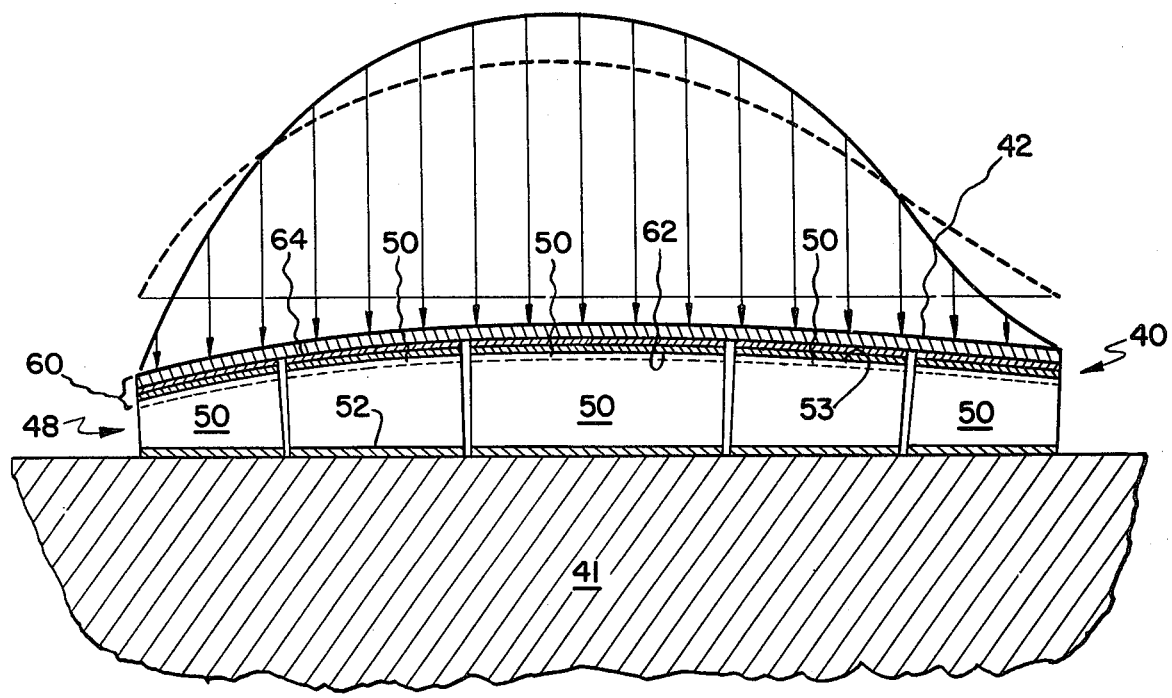
FIG. 5 is a sectional elevation of the bearing pad along lines 5—5 in FIG. 2 along with the pressure profile over the bearing pad at a high rotor speed.

The increasing speed of the thrust runner 22 over the parabolic shape of the pad assembly produces a broader, longer, and higher pressure profile over the pad assembly which deflects to a spherical crown shape as shown in FIG. 4.

The structure of the pad assembly is selected to promote these changes of bearing surface forms under the changing speed and load conditions of the thrust runner. The use of two stiffener sheets, with the top sheet extending from the trailing edge toward the leading edge farther than the bottom sheet and connected only at their trailing edges, and a support element having resilient elevations that increase in stiffness from leading to trailing edge provides a stiffness gradient for the bearing sheet 42 which is most compliant at the leading edge and becomes stiffer toward the trailing edge. By using separate sheets connected only at the trailing edge, the sheets can slide relative to one another when they bend as shown in FIG. 4 to enable them to bend without merely flattening the corrugated support element while providing sufficient support to prevent the bearing sheet from deflecting into the valleys of the corrugated support element to the detriment of the load carrying capacity of the pad assembly.

The relative motion of the stiffener sheets also provides a damping effect. The damping absorbs energy which I believe originates from small imperfections in the rotor surface. These imperfections introduce a perturbation in the fluid film over the bearing sheet, experienced by the sheet as a series of periodic impulses which grow in strength and frequency as the rotor speed increases. When the strength of these impulses become significant and the frequency approaches the natural frequency of the bearing sheet, the amplitude of its vibrations increase greatly. These vibrations are detrimental to the operation of the bearing and it is for their attenuation that the damping is provided. The damping is particularly effective for this purpose because it increases proportionately with the force of the effect which it is designed to mitigate. That is, as the strength of the impulses increase, they will force the stiffener sheets together harder and also cause greater relative motion between them by creating a traveling wave across the bearing sheet and its supporting structure. This increased motion of the stiffener sheets relative to each other and relative to the bearing sheet and bump foil and the greater force at the rubbing interface causes greatly increased coulomb damping just when it is most needed.

The chordal or secant slits in the support element 48 and the stiffener sheets 62 and 64 enable the stiffener sheets and the support element to deflect individually as separate strips so that deflection of one portion of the support element 48 or the stiffener sheets does not affect the radially adjacent portions. This permits the support element and stiffener sheets to act under the influence of the hydrodynamic load immediately above it and assume the correct profile to carry that load without being raised, lowered, or twisted by deflections of adjacent portions of the support element or stiffener sheets.

The stiffness gradient of the support for the bearing sheet 42 need not be uniformly progressive from leading to trailing edge. For example, it may be desirable to make the support stiffness in the region of the trailing two bumps be identical, or increase in stiffness only slightly. It should also be noted that the pad is actually stiffest at the leading edge where the bearing sheet 42 is welded to the solid spacer block 44. However, the active portion of the pad is in all cases softest at the leading edge and increases in stiffness toward the trailing edge.

As a consequence of the aforementioned structure, it is possible to build a bearing pad assembly having a high load carrying capacity with a light gauge bearing sheet. This makes the bearing sheet more responsive to changing load conditions without deflecting into the valleys of the corrugated support element.

The stiffener sheets are both formed of thinner gauge material than the bearing sheet. The stiffener element is thus strong enough to support the bearing sheet between the ridges of the support element but flexible enough to bend under the influence of the nonuniform hydrodynamic pressure profile over the bearing sheet. It also provides an inexpensive and effective manner of establishing a stiffness gradient for the support element from the leading toward the trailing edge and stabilizing the bearing sheet against resonant vibrations.

The corrugations of the support element 48 lie parallel to the trailing edge of the bearing pad assembly. This provides a flat straight lip for the support of the trailing edge of the bearing sheet and stiffener element along the line on which they are welded. By forming the leading edges of the stiffener sheets parallel to the direction of the corrugations, it is possible to lay the leading edge of the stiffener sheets over the valleys of the support element so that a sharp demarkation of support for the bearing sheet does not occur at the leading edge which might otherwise tend to cause a sharp line along which abrasion and heat from a thrust runner in contact with the bearing sheet could be concentrated and damage the bearing sheet.

A tube is approximately 1.2 times stiffer than a ring. This is one reason for orienting the axis of the corrugations in the support element 48 parallel to the trailing edge of the bearing pad assembly which is where the support needs to be stiffest. In the truncated sector shape pad design, this orientation of the corrugation's axes produces a series of short bumps at the leading edge of the pad assembly. The short bumps at the leading edge are more compliant than the longer bumps at the trailing edge and therefore the support element is somewhat softer at its leading edge where the greater compliance is needed.

The bearing disclosed herein is thus able to generate a load supporting fluid film over this bearing surfaces at lower speeds because of its greater compliance at the leading edge and stiffness at the trailing edge which enables it to assume a tapered land profile and then carry a greater load at high speeds because of the stiffness gradient of the stiffener element which enables the bearing pad assembly to deflect to profiles which are conducive to the generation of broad high pressure supporting fluid films over the surface of the bearing sheet without deflecting between the support points of the support element. The damping provided by the stiffener sheets offers greatly improved stability to the bearing without the need of external or complicated extra damping.

Obviously, numerous modifications of variations of the disclosed embodiments are possible in view of the teachings herein. Therefore, it is expressly to be understood that these modifications and their equivalents may be practiced while remaining within the spirit and scope of the appended claims, wherein I claim:

I claim:

1. A compliant hydrodynamic bearing for dynamically supporting a rotating rotor on a mount, including a plurality of pad assemblies positioned between the rotor and the mount, each said pad comprising:
   a flexible sheet metal bearing sheet having a bearing surface in bearing relationship to said rotor and operatively attached to the mount along the bearing sheet leading edge, in the sense of the direction of rotation of the rotor;
   a compliant support element, operatively fixed to the mount, lying between said bearing sheet and the mount, and having resilient elevations projecting therefrom compliantly supporting said bearing sheet;
   a first flat stiffener sheet having a leading edge and a trailing edge, said first stiffener sheet lying upon said support element with said trailing edge thereof aligned with said trailing edge of said bearing sheet, and extending toward said bearing sheet leading edge; and
   a second flat stiffener sheet having a leading edge and a trailing edge, said second stiffener sheet lying between said first stiffener sheet and said bearing sheet and extending forwardly toward said bearing sheet leading edge, substantially beyond said first stiffener sheet, but short of the forward edge of said support element.

2. The bearing defined in claim 1, wherein said first and second stiffener sheet are both thinner than said bearing sheet.

3. The bearing defined in claim 1, wherein:
   said bearing is a thrust bearing, and said pad assemblies are each sector-shaped in plan, and said leading edges of said stiffener sheets lie parallel to said bearing sheet trailing edges.

4. The bearing defined in claim 1, wherein said bearing is a thrust bearing, and support element is a corrugated sheet spring member, and said resilient elevations are ridges separated by valleys extending generally parallel to one of said leading and trailing edges.

5. The bearing defined in claim 4, wherein said first and second stiffener sheets' leading edges lie over valleys of said support element.

6. The bearing defined in claim 5, wherein said second stiffener sheet lies over the next adjacent valley forward of the valley over which lies the leading edge of the first stiffener sheet.

7. The bearing defined in claim 4, wherein said ridges and valleys of said support element all lie parallel to said trailing edge, and said first and second stiffener sheets leading edges lie over valleys in said support element.

8. The bearing defined in claim 4, wherein said ridges are flattened on the top surface thereof.

9. The bearing defined in claim 1, wherein said resilient elevations are graduated in height, decreasing from said leading edge toward said trailing edge of said bearing sheet, and increasing in stiffness.

10. The bearing defined in claim 1, wherein first and second stiffener sheets are welded at the trailing edges thereof to the trailing edge of said bearing sheet.

11. The bearing defined in claim 1, wherein said support element includes a plurality of cuts therein extending generally parallel to the direction of rotor rotation dividing said support element into at least three strips; and said stiffener sheets each include a plurality of cuts therein extending generally parallel to said support element cuts and dividing said stiffener sheets into a plurality of strips.

12. The bearing defined in claim 11, wherein said cuts in said first stiffener sheet are aligned with said cuts in said second stiffener sheet.

13. The bearing defined in claim 11, wherein said cuts in said support element and said stiffener sheets are all aligned.

14. The bearing defined in claim 13, wherein said bearing is a thrust bearing, said pads are all sector-shaped, and said cuts are all secant cuts extending perpendicular to the radial centerline of said pad.

15. A compliant hydrodynamic fluid film bearing including a fixed member; a rotating member; said members defining therebetween a gap; a plurality of bearing pads in said gap attached to said fixed member and in bearing relation to said rotating member; said pads each having a bearing sheet facing said rotating member and a resilient, compliant support element underlying and supporting said bearing sheet and fastened to said fixed member; wherein the improvement comprises:

means establishing a gradient of decreasing stiffness of each of said bearing pads from the trailing edge thereof toward the leading edge in the direction of rotation of the rotating member, said pads each having a compliant zone adjacent the leading edge and terminating in a stiff zone;

wherein the stiffness pattern over the area of the bearing pad militates for an optimal deflection pattern of said bearing sheet, viz. large deflection adjacent the leading edge and decreasing deflection toward the trailing edge of said pad to provide a tapering wedge at the leading edge and strong support at the trailing edge, to produce a maximal load bearing capacity hydrodynamic fluid film over the bearing sheet throughout the full speed range of the bearing.

16. The bearing defined in claim 15 wherein said stiffness means includes a series of resilient elevations on said support element, said elevations increasing in stiffness from the leading edge toward the trailing edge.

17. The bearing defined in claim 16, wherein said elevations are in the form of bumps on said support element, and said increase of stiffness is provided by changes of at least one of the following parameters: bump height, bump length, bump pitch, bump shape, and bump material thickness.

18. The bearing defined in claim 16, wherein said elevations are bumps on said support element, and said bumps decrease in height toward the trailing edge of said support element; said stiffness means also including a stiffening element overlying said bumps and underlying said bearing sheet.

19. The bearing defined in claim 18, wherein said stiffening element is graduated in thickness, increasing in the direction of movement of said rotating member.

20. The bearing defined in claim 19, wherein said stiffening element includes two stiffening sheets, one of which extends farther toward said leading edge than the other.

21. The bearing defined in claim 20, wherein said one stiffening sheet overlies the other stiffening sheet.

22. The bearing defined in claim 21, wherein both stiffening sheets are attached to said pad at their trailing edges.

23. The bearing defined in claim 21, wherein said stiffening sheets are both attached at their trailing edges to the trailing edge of said bearing sheet.

24. The bearing defined in claim 20 wherein said bearing is a thrust bearing and said height graduation of said bumps is just sufficient to accommodate the thickness of said stiffening element whereby the height of said bearing pad is substantially uniform across the bearing surface beyond the center of said pad.

25. A compliant hydrodynamic fluid film bearing comprising:

a mount and a relatively rotating rotor, defining therebetween a gap;

a plurality of bearing pads in said gap, affixed to said mount, each having a leading edge and a trailing edge in the sense of the direction of rotation of said rotor;

each said pad including a bearing sheet having a bearing surface in bearing relationship to said rotor, a resilient support element attached to said mount and underlying and providing compliant support for said bearing sheet, and stiffening means lying between said bearing sheet and said support element for increasing the stiffness of portions of the support for said bearing sheet;

said stiffening means including a stiffener element extending from said trailing edge toward said leading edge, terminating short of said leading edge;

said stiffener element being formed of a plurality of strips running generally parallel to each other and to the direction of motion of said rotor.

26. The bearing defined in claim 25, wherein said stiffening means has a stiffness gradient from said trailing edge to said leading edge, whereby said bearing sheet presents a tapered land profile to said rotor bearing surface at low speeds thereof, and changes shape at high speeds thereof to a spherical crown.

27. The bearing defined in claim 26, wherein said stiffener element includes two stiffener sheets, one of which extends farther toward the leading edge than the other, said stiffener sheets being attached together only at the trailing edge of said pad.

28. The bearing defined in claim 25, wherein said stiffening element is more compliant at its leading edge than in its central portion.

29. The bearing defined in claim 25, wherein said support element is a corrugated sheet spring member having resilient ridges supporting said bearing sheet and said stiffener element, said ridges being separated by valleys which engage said mount, said stiffener element overhanging the valley at the leading edge of said element and being more compliant at the leading edge than at the central portion thereof.

30. The bearing defined in claim 29, wherein said stiffener element includes two stiffener sheets, one of which extends farther forward toward the leading edge than the other stiffener sheet, each stiffener sheet terminating at its leading edge over a valley of said support element.

31. The bearing defined in claim 30, wherein the stiffness of at least one of said stiffener element and said support element varies across said pad in the direction perpendicular to the direction of rotor motion.

32. A compliant fluid film bearing for dynamically supporting a rotating rotor, comprising:

a mount having a support surface for installation with the support surface thereof generally parallel to the bearing surface of the rotating rotor;

a resilient compliant support element fastened to and supported by said mount;

a flexible sheet metal bearing sheet operatively supported by said support element and lying between said support element and the rotor;

stiffener means lying between said bearing sheet and said support element and having a stiffness gradient between the leading and trailing edges such that, as the rotational speed of the rotor increases, the bearing sheet changes shape, under the influence of hydrodynamically generated fluid pressure and resilient support, serially from tapered land to parabolic curve, and to spherical crown.

33. The bearing defined in claim 32, wherein said stiffener means and said support element provide greater stiffness at the trailing edge of said bearing sheet in the direction of rotation of said rotor, and provide greater compliance at the edges of said bearing sheet which extend parallel to the direction of rotation of said rotor.

* * * * *